(12) United States Patent
Koida

(10) Patent No.: US 6,778,371 B2
(45) Date of Patent: Aug. 17, 2004

(54) DEVICE FOR SUPPLYING ELECTRICAL POWER TO DETECTORS, CONTROL DEVICES AND SIGNALING DEVICES

(75) Inventor: Gerhard Koida, München (DE)

(73) Assignee: Robert Bosch GmbH, Stuttgart (DE)

(*) Notice: Subject to any disclaimer, the term of this patent is extended or adjusted under 35 U.S.C. 154(b) by 96 days.

(21) Appl. No.: 10/148,426

(22) PCT Filed: Aug. 25, 2001

(86) PCT No.: PCT/DE01/03263

§ 371 (c)(1),
(2), (4) Date: Oct. 24, 2002

(87) PCT Pub. No.: WO02/29750

PCT Pub. Date: Apr. 11, 2002

(65) Prior Publication Data

US 2003/0112570 A1 Jun. 19, 2003

(30) Foreign Application Priority Data

Sep. 30, 2000 (DE) .......................... 100 48 599

(51) Int. Cl.⁷ ............................................... H02H 9/08
(52) U.S. Cl. ..................................................... 361/93.9
(58) Field of Search ........................ 361/93.9, 71, 115, 361/116

(56) References Cited

U.S. PATENT DOCUMENTS 4,752,698 A 6/1988 Furuyama et al.
5,801,913 A * 9/1998 Pittel ............................ 361/71

FOREIGN PATENT DOCUMENTS

| DE | 36 19 289 | 12/1987 |
| EP | 0 101 172 | 2/1984 |
| EP | 0 111 178 | 6/1984 |
| EP | 0 626 743 | 11/1994 |
| EP | 0 927 982 | 7/1999 |

* cited by examiner

Primary Examiner—Stephen W. Jackson
Assistant Examiner—James A Demakis
(74) Attorney, Agent, or Firm—Kenyon & Kenyon

(57) ABSTRACT

A device for supplying electrical power to detectors, control systems, and signaling systems is described, in which the power supply line can be implemented as a ring. Each of the peripheral consumers connected to the ring has a power supply device which connects through the power supply line to the next power supply device depending on a minimum voltage. Power supply terminals, which detect short-circuits and/or interruptions on the power supply ring and therefore the lack of power supply to a detector, are each connected to a ring input and a ring output. Alternatively, the power supply line may be implemented as a spur line, with power supply then provided up to an occurring short-circuit or an interruption. In the case of the spur line, the control center is informed in that it receives signals from the individual detectors about an existing power supply via an alarm line.

9 Claims, 4 Drawing Sheets

DEVICE FOR SUPPLYING ELECTRICAL POWER TO DETECTORS, CONTROL DEVICES AND SIGNALING DEVICES

FIELD OF THE INVENTION

The present invention relates to a device for supplying electrical power to detectors, control systems, and signaling systems.

BACKGROUND INFORMATION

Conventional alarm signaling systems, in particular fire alarm systems and/or burglar alarm systems, have detectors, control systems, and signaling systems widely distributed in the regions to be monitored. The power supply of the detectors, control systems, and signaling systems is, for example, provided via a core pair to which all peripheral consumers, i.e., the detectors, control systems, and signaling systems, are connected in parallel. The core pair originates at the alarm signaling control center. As used herein, control center refers to an alarm signaling control center or system. In the event of a short-circuit, the control center reacts in such a way that all consumers lose power, since the power supply is disconnected from the power supply line by the control center.

A further method for supplying the detectors, control systems, and signaling systems of the control center with power is for every peripheral consumer to be supplied using a separate power supply unit and/or a battery or a separate line originating at the control center. If the peripheral consumers are each supplied using their own line, which originates at the alarm signaling control center, then an individual fuse to protect against short-circuits is required in each case.

SUMMARY OF THE INVENTION

The device according to the present invention for supplying electrical power to detectors, control systems, and signaling systems has the advantage over the related art that the power supply for the peripheral consumers, i.e., the detectors, control systems, and signaling systems, does not fail in the event of a short-circuit, although the peripheral consumers are connected to a power supply line. This is because each detector has an overcurrent detector and a disconnection element of its own to interrupt the power supply line using the disconnection element in the event of a short-circuit, so that the power supply originating at the control center is not loaded by a short-circuit. At the same time, only one power supply line is necessary, so that significant material and outlay for individual fuses to protect against short-circuits may be saved.

It is particularly advantageous if during the startup of the power supply each detector or each control system or signaling system automatically determines whether a short-circuit exists on the following section of line. The following line is connected or disconnected to the power supply depending the outcome of this determination. The power supply system maintains this state for the respective detector until the power supply is switched off by the control center. If a short-circuit occurs after an undisrupted startup, the power supply terminal in the control center detects an overcurrent, switches the power supply off, and begins a new startup of the power supply. An interruption in the power supply line is identified when one or more detectors is not supplied with energy and the alarm line of the control center does not enter the idle state. With more modern alarm line technology, the detectors affected can also be identified. This allows targeted and rapid repair and provides an indication as to which regions problems may exist.

It is particularly advantageous if the power supply line is implemented as a ring so that, in the event of an interruption or a short-circuit between two detectors or control and signaling systems, the detectors, control systems, and signaling systems may be supplied with electrical power from two sides. In this way, a short-circuit or an interruption may be remedied easily. For this purpose, each detector or control and signaling system has a power supply device for supplying electrical power which may be supplied in both directions.

Furthermore, it is advantageous if the control center has a counter in a power supply terminal at the ring output that can monitor the wiring of the power supply line outwardly from the ring input. If the counter counts to a predetermined value, then the control center determines that the voltage is not connected through from the ring input up to the ring output, with the counter being stopped as soon as the power supply voltage is detected at the ring output. In this case, neither an interruption nor a short-circuit is present and all components connected to the power supply line are supplied with electrical power. If the counter counts to zero, a short-circuit and/or an interruption is detected, so that the power supply line then has electrical power applied to it outwardly from the ring output in order to supply electrical power to the peripheral consumers not yet supplied. In this way, a short-circuit and/or an interruption occurring in the ring is isolated and does not lead to detectors or control systems or signaling systems, which may be supplied with electrical power outward from the ring input and/or output, remaining without power. During operation, supply outward from the ring input or from the ring output also offers the possibility of reacting to a short-circuit or an interruption occurring during operation. In this case, the control center is not informed in that the individual detectors, control systems, or signaling systems having their power supply devices according to the present invention notify the control center via the alarm line that a short-circuit or an interruption exists. The power supply terminal in the control center automatically determines in this case whether a malfunction exists on the power supply ring. Therefore, it is additionally possible to flexibly operate the power supply outwardly from the ring input or from the ring output. Thus, if an interruption or a short-circuit exists, this short-circuit is isolated, the interruption itself is already isolated, and the consumer on the ring is supplied with electrical power from both ring directions. Therefore, the present invention leads to a more reliable system.

In this case, it is also advantageous if the individual consumers which are connected to the ring or, particularly, to a spur line, communicate a notification regarding successful power supply to the control center via the alarm line so that the control center is instantaneously informed about the power supply of the individual consumers.

It is further advantageous in this case if, in the event of a short-circuit, i.e., an overcurrent or an interruption, the control center triggers signaling to inform users of this condition. Such signaling includes either a display, an acoustic signal, or an electronically transmitted notification. Combinations of these signaling possibilities may also be used.

Furthermore, it is advantageous if each power supply device according to the present invention is operable at a distance from the housing of the detector of the control or signaling system, so that the power supply device according to the present invention may be used for each detector. In addition, there are also detectors which may be supplied with sufficient electrical power via the alarm line alone, so that the power supply line does not have to be connected through in this case. The remote design also makes the maintenance of the consumer and the device according to the present invention significantly simpler.

In addition, it is advantageous if the control center has an analog/digital converter, which provides for detection of creeping short-circuits or interruptions. This allows preventive countermeasures in order to ensure the operation of an alarm signaling system without interruptions.

DETAILED DESCRIPTION

Figure 1:
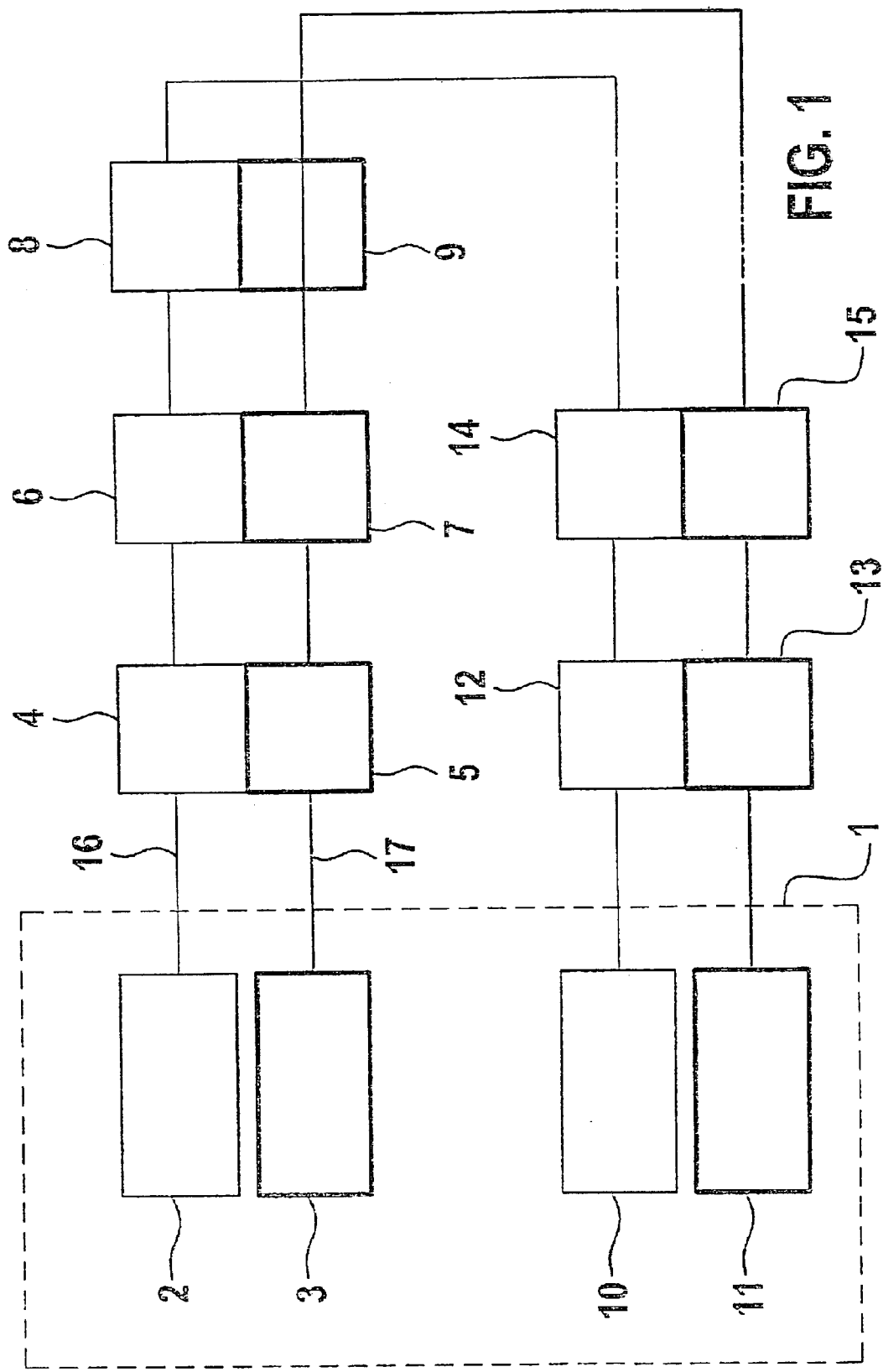
FIG. 1 shows a configuration of the alarm signaling system as a ring according to an embodiment of the present invention.

Current alarm lines in security technology have significantly more central and peripheral intelligence, e.g., the local security network (LSN), than in the past. These systems are capable of maintaining full functionality in the event of simple short-circuits or interruptions. They are generally not implemented as a spur line, but in ring configuration, i.e., the LSN core pair begins in the control center and leads by the peripheral detectors and other devices in various fire regions or burglary alarm regions as a ring line and then returns to the control center.

Therefore, according to the present invention, devices for supplying electrical power to detectors, control systems, and signaling systems are improved in such a way that the electrical power supply to the detectors, the control systems, and the signaling systems is maintained in the event of short-circuits and interruptions. This is achieved in that every detector, every control system, and every signaling system which is connected to the power supply line is equipped with a power supply device having a disconnection element and its own overcurrent detector and/or limiter. Thus, distributed intelligence is implemented in an alarm signaling system in regard to the identification of short-circuits and interruptions.

If an overcurrent recognition system of a peripheral consumer identifies a short-circuit during the startup procedure of the power supply, the disconnection element of the power supply device is opened so that the short-circuit is electrically isolated.

In spur lines, the power supply devices are arranged in series, while in an energy supply which is implemented in ring technology, the power supply devices according to the present invention for each of the peripheral consumers may be supplied with electrical power from both sides, outwardly either from the ring input or from the ring output. In this way, the isolation of a short-circuit on the ring from both sides is made possible. In pure spur lines, the consumers which are present downstream of a short-circuit or an interruption have no further electrical power supply. In the case of the spur line, the control center is informed in that the unsupplied detectors, control systems, and signaling systems signal the lack of a power supply via the alarm line to the control center.

If, using current ring technology, the ring is supplied with power outwardly from the ring input, a counter is activated which counts to a predetermined value and indicates, when this number is reached, that the power supply from the ring input has not reached the ring output. This is a sign that the power supply is to be activated from the ring output in order to supply all consumers connected to the ring with power, provided they are capable of being reached via the power supply line. If a short-circuit and/or overcurrent or an interruption is detected on the power supply line, a controller of the control center activates means for signaling, in order to display this to users. It is possible to discover creeping short-circuits and interruptions early using an analog/digital converter which is located in the control center.

In FIG. 1, the configuration of an alarm signaling system as a ring is illustrated as a block diagram. A control center 1 has an alarm line terminal 2 for the ring input, a power supply terminal 3 for the ring input, an alarm line terminal 10 for the ring output, and a power supply terminal 11 for the ring output. Alarm line terminal 2 is connected to alarm line 16. In this example, alarm line 16 is the local security network (LSN) from Bosch. Alarm line terminal 10 is also connected to alarm line 16. Power supply terminals 3 and 11 are connected to power supply line 17. Detectors 4, 6, 8, 12, and 14 are connected in series to alarm line 16. Power supply devices 5, 7, 13, and 15 are connected in series to power supply line 17, while a through-connection exists for detector 8, since detector 8 may be supplied with power via alarm line 16. Power supply devices 5, 7, 13, and 15 have disconnection elements in order to electrically disconnect the respective power supply line connected if a short-circuit condition exists. Control center 1 may further have an analog/digital converter to evaluate whether creeping short-circuits and/or interruptions exist on power supply line 17.

A supply voltage is relayed to first power supply device 5 from power supply terminal 3, the first power supply terminal. A small constant voltage having current limiting is relayed from power supply device 5 as far as power supply device 7 using a time delay. If the current limiting does not respond, after a further time delay the full supply voltage is relayed to power supply device 7 in second detector 6 without current limiting. The procedure proceeds further in this way until power supply device 13, as the last in the ring, relays the full supply voltage to control center 1 and therefore to power supply terminal 11 as the second power supply terminal.

Detectors 4 and 6 are assigned power supply devices 5 and 7, respectively. Through-connection 9 is assigned to detector 8, since detector 8 is supplied with power via alarm line 16. Detectors 12 and 14 are assigned power supply devices 13 and 15. Instead of detectors, control systems or signaling systems may also be used. Instead of the five consumers, which are connected to the ring, illustrated here, a greater or lesser number of consumers is also possible.

Figure 4:
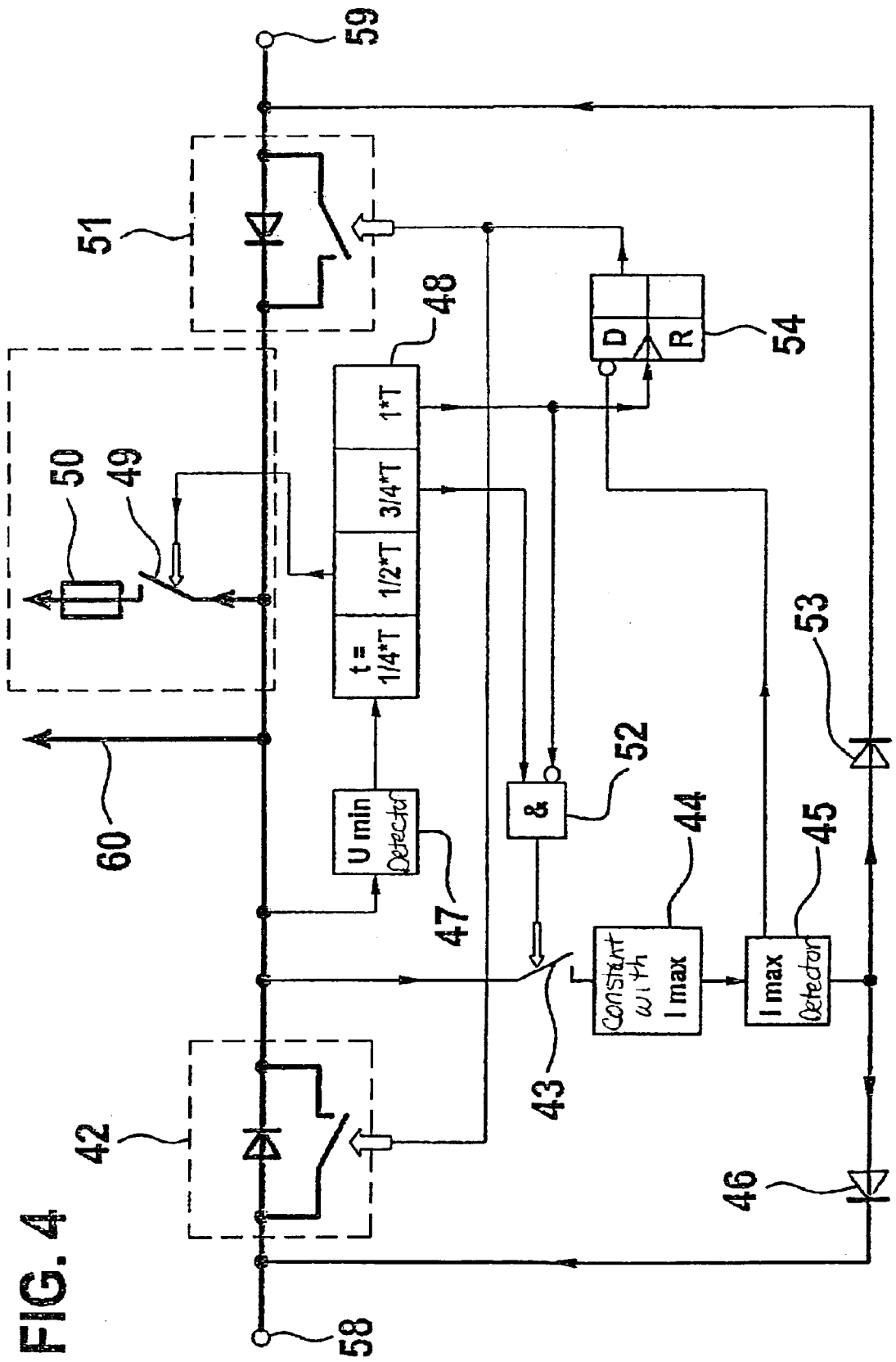
FIG. 4 shows a design of the power supply device according to an embodiment of the present invention which is operated in a remote housing.

If the current limiting responds in a power supply device during relay of the small constant voltage due to a short-circuit, the constant voltage is removed and the supply voltage is not switched further. Since no voltage is received downstream of power supply device 13 at power supply terminal 11 after the expiration of a predetermined time, the supply of power supply device 13 is then initiated starting from this terminal 11. The procedure now proceeds from the other side of the ring, since the power supply devices are symmetrically designed, as shown in FIG. 4.

Alternatively, it is possible that the device according to the present invention for power supply of peripheral consumers is implemented as a spur line. Then, however, the control center has only one power supply terminal. If a short-circuit or an interruption occurs and a power supply device interrupts the power supply line using a disconnection element, the subsequent peripheral consumers are without a power supply.

The concept of peripheral consumers is also used for the detectors, control systems, and signaling systems. The control center has a controller which may be implemented as a processor or as a control unit. The counter in the control center may count upwards or downwards.

Figure 2:
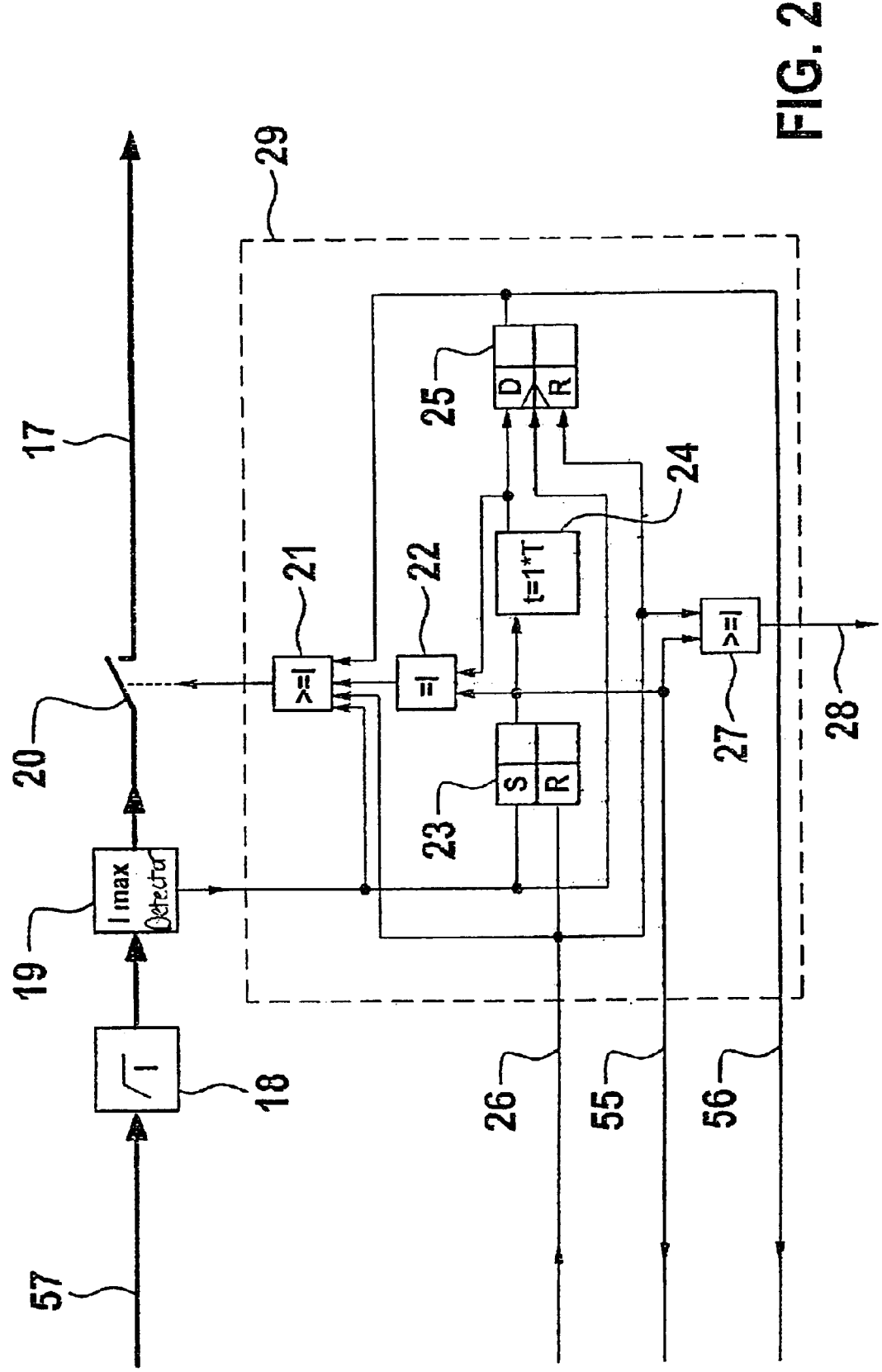
FIG. 2 shows a design of the power supply terminal at the ring input according to an embodiment of the present invention.

The design of power supply terminal 3 according to the present, invention for the ring input is illustrated as a block diagram in FIG. 2. Power supply terminal 3 receives the electrical power from a central power supply unit of control center 1 via line 57. Using a current limiter 18 and an overcurrent detector 19, an excessive current coming from the central power supply unit of control center 1 is prevented from being relayed to power supply line 17. This avoids unnecessary load on power supply line 17 and the elements connected downstream. Current limiter 18 may, for example, be implemented using a transistor controlled by a current sensor resistor, while overcurrent detector 19 may be implemented as a comparator controlled by a current sensor resistor.

The power output of overcurrent detector 19 leads to a switch 20, which connects overcurrent detector 19 to power supply line 17 in the closed state. A data output of overcurrent detector 19 leads to a first data input of a gate 21 and to a first data input of a memory 23 and to a clock input of a memory 25. Gate 21, whose output leads to switch 20, in order to switch 20, a gate 22, memory 23, a delay element 24 for the time delay, memory 25, and a gate 27 form digital controller 29 of power supply terminal 3.

An output of gate 22 leads to the second data input of gate 21. A second data input of memory 23 is connected to the central controller via a line 26 in order to, if necessary, receive a pulse for resetting, which indicates at the same time that power supply line 17 is to be reconnected to the voltage supply from the central power supply unit via a line 57. This input is operated during startup or after repair of the power supply line, for example after a short-circuit on the power supply line has been eliminated.

Line 26 coming from the central controller leads to a fourth input of gate 21, a second data input of memory 23, to a second input of gate 27, and to a second data input of memory 25. In the event of a pulse from the central controller, the power supply terminal at the ring input is reset, i.e., all memories are reset, and the power supply of the periphery is switched off and subsequently put into operation again.

The output of memory 23 leads to a first input of gate 22, to an input of delay element 24, to a first input of gate 27, and also leads to the controller via line 55 in order to, if necessary, transmit a signal which indicates a short-circuit on power supply line 17. An output of delay element 24 leads to a second input of gate 22 and to a data input of memory 25. The output of memory 25 leads to the third input of gate 21 and also to a line 56 via which the signal that power supply terminal 3 is switched off is transmitted, if necessary. An output of gate 27 leads to power supply terminal 11.

If a short-circuit in power supply terminal 3 of control center 1 is detected using overcurrent detector 19, a corresponding output signal is generated via memory 23, which is implemented as a flip-flop, so that switch 20 is finally opened and a short-circuit for power supply terminal 3 is indicated to the central controller via line 55. The controller is a processor in control center 1, or it may also be implemented as a control unit.

After the occurrence of the first short-circuit, switch 20 is closed again after a predetermined time delay, which is set using delay element 24, in order to trigger a single new switching-on procedure. It is then checked again whether overcurrent detector 19 still indicates an overcurrent, i.e., a short-circuit. If this is the case, gate 21 combines these signals and leaves switch 20 opened or opens it, since memory 25 is driven. Furthermore, the signal that power supply terminal 3 is switched off is transmitted to the central controller in alarm signaling control center 1 via line 56, since a short-circuit is located directly at power supply terminal 3, i.e., on power supply line 17 between power supply terminal 3 and power supply device 5.

Figure 3:
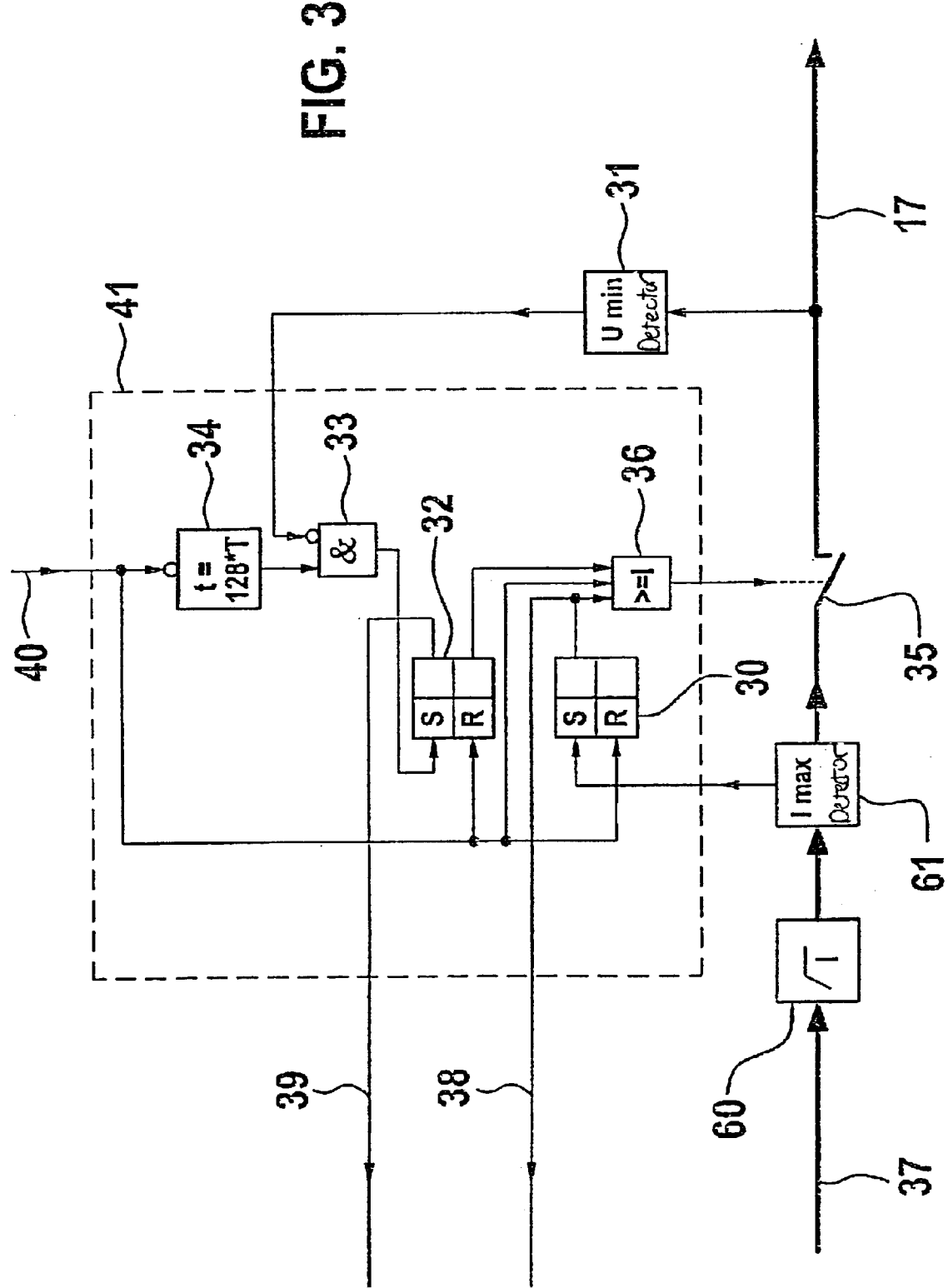
FIG. 3 shows a design of the power supply terminal at the ring output according to an embodiment of the present invention.

In FIG. 3, power supply terminal 11 is illustrated as a block diagram in relation to its internal design. Power supply terminal 11 is connected to the power supply unit of control center 1 via a line 37. Line 37 is connected to a current limiter 60. Current limiter 60 is followed by an overcurrent detector 61. A power supply output of overcurrent detector 61 leads to a switch 35, which connects overcurrent detector 61, on one hand, to line 17 and, on the other hand, to a voltage detector 31. A data output of overcurrent detector 61 leads to a first input of a memory 30. Switch 35 is switched by a gate 36, and this is done depending on the wiring of the inputs of gate 36.

An output of memory 30 is connected to a first input of gate 36. The output of memory 30 leads further to line 38, which is connected to the controller of control center 1, in order to, if necessary, transmit the signal to the controller that a short-circuit is present directly at power supply terminal 11, i.e., on power supply line 17 between power supply terminal 11 and power supply device 13. Line 40 is connected to a second input of gate 36. Line 40 transmits a signal from power supply terminal 3, which is used for the purpose of controlling digital controller 41 during a startup procedure of the power supply.

A first output of a memory 32 is connected to a third input of gate 36. Line 40 is also connected to a second input of memory 30. Line 40 is also connected to a first input of memory 32. In addition, line 40 leads to a inverted input of a time delay 34. An output of time delay 34 leads to a first input of a gate 33. An output of voltage detector 31 is connected to a second inverted input of gate 33. An output of gate 33 leads to a second input of memory 32. An output of memory 32 leads to line 39, via which the signal that an interruption exists on the ring of the power supply line can be transmitted to the controller of control center 1. The interruption on the ring of the power supply line comes either from a line interruption or from an interruption by a power supply device 5, 7, 13, or 15 on the ring of the power supply line in that one of these power supply devices keeps its switch open between two power supply devices due to a short-circuit.

Time delay 34, gate 33, memories 30, 32, and gate 36 form digital controller 41 of power supply terminal 11.

If voltage detector 31 detects that the intended minimum supply voltage does not exist on line 17, voltage detector 31 outputs a signal to gate 33, which is implemented as an AND gate. This signal is combined with a signal from time delay 34 which releases the inverted input signal when the predetermined time delay has passed. This predetermined time delay corresponds to the time which is necessary for the power supply to be connected through all power supply devices to all detectors, control systems, and signaling systems. Therefore, if the voltage has not been detected after the time delay has passed, AND gate 33 drives memory 32, so that memory 32 transmits the signal that a ring interruption exists to control center 1 via line 39. Simultaneously, an inverted signal of memory 32 is sent via a second output to gate 36, so that switch 35 may be closed. Therefore, if a one is used as the signal for the ring interruption, i.e., from the first output of memory 32, then a zero is transmitted via the second output to gate 36, so that switch 35 is closed. Therefore, power supply is started from the ring output outward. If the signal that power supply terminal 3 is not supplying line 17 with power is transmitted via line 28 from FIG. 2 and via line 40, then gate 36 ensures that switch 35 is closed in order to supply line 17 outwardly from the ring output.

In this case, a supplying of a part or entire ring of the power supply line from power supply terminal 11 is thus begun.

If an overcurrent coming from the power supply unit of control center 1 is detected by overcurrent detector 61, then the signal from overcurrent detector 61 drives memory 30, which transmits the signal to gate 36 so that switch 35 is opened. Simultaneously, the signal that a short-circuit exists directly at power supply terminal 11 is transmitted to the controller of control center 1 via line 38.

Lines 55, 56, 39, and 38 leading to the control center controller may also, using additional gates, be combined into one single line which relays the signal that a malfunction exists in general on the power supply ring. In this case, no details of the malfunction are relayed.

In FIG. 4, the design of a power supply device of a peripheral consumer according to an embodiment of the present invention (detector, control system, or signaling system) is illustrated as a block diagram. The design can be identical for each power supply device. A first terminal 58, to which power supply line 17 is connectable, and a second power supply terminal 59 are alternately connectable, therefore it is possible to supply power to peripheral consumers from two sides.

Terminal 58 is followed, on one hand, by an FET (field effect transistor) switch 42 and, on the other hand, by a diode 46 in the blocking direction. FET switch 42 includes a parasitic diode and the actual switch. The parasitic diode is conditioned by the electrical properties of an FET, while the switch is, for example, implemented by depleting or enhancing the channel by a gate voltage. Other circuit breakers are also possible as alternatives to the FET switch.

The switch of FET switch 42 is connected to an output of a memory 54, so that memory 54 controls FET switch 42. The output of memory 54 is further connected to the control input of FET switch 51. Therefore, memory 54 closes both FET switches 42 and 51 in parallel or opens them in parallel.

A signal output of an overcurrent detector 45 is connected to one input of memory 54. A first output of a time delay 48 is connected to a clock input of memory 54, which is, for example, implemented as a D-flip-flop. Thus, if an overcurrent is detected, i.e., a short-circuit exists, then memory 54 leaves FET switches 42 and 51 in the open state. Overcurrent detector 45 detects the overcurrent from a constant voltage source 44 having overcurrent limiting. This constant voltage source 44 is switched via a switch 43 which is, in turn, controlled by an AND gate 52. The first output of time delay 48 is connected to an inverted input at AND gate 52 and a second output of time delay 48 is connected to an input. Time delay 48 receives a signal from a minimum voltage detector 47 via its input. Minimum voltage detector 47 detects whether the minimum voltage exists on power supply line 17, so that the short-circuit test is informative using the small constant voltage. FET switches 42 and 51 may be closed in order to connect the current through to the next power supply device on the ring via power supply line 17. If minimum voltage detector 47 detects that this voltage does not exist, switches 42, 43, and 51 are not closed.

Upon the application of a supply voltage from terminal 58, with FET switches 42 and 51 being open and memory 54 being reset, a sufficient voltage is detected by minimum voltage detector 47 via the diode of switch 42. The following procedure then begins: after a time delay of 3/4 T has passed, i.e., the third element of time delay 48, the constant voltage is connected through from constant voltage source 44 to terminal 59. In the event an overcurrent is detected, memory 54 is kept at the state zero, after the time delay of one T has passed, i.e., the fourth element of time delay 48 having the first output, and FET switches 42 and 51, remain open. If an overcurrent is not detected, the state one is maintained in memory 54 at the output. Therefore, the FET switches are digitally controlled using the output of memory 54 in order to connect through power supply line 17.

The detector to be supplied, which is assigned to the power supply device, receives its supply via connection 60. If this is, for example, power supply device 5, associated detector 4 is supplied via connection 60.

According to a particular embodiment, the power supply device includes an additional switch if necessary, which is digitally switched on using time delay 1/2 T, i.e., the second element of time delay 48. If the detector to be supplied, the control system to be supplied, or the signaling system to be supplied is a consumer which has a power consumption having strongly elevated starting current during application of the power supply, for example having a switching voltage transformer in its own power supply circuit or components having an identical effect, then this refinement of the power supply device may be provided. The detector is then not connected via connection 60, but rather via switch 49 and possibly a fuse 50.

In another embodiment, the control center includes an analog/digital converter, with the aid of which the voltage at the location of voltage detector 31 in power supply terminal 11 is monitored for changes during operation and possibly the current in power supply terminal 3 is also monitored. In this way it is possible to discover creeping short-circuits and creeping interruptions early.

What is claimed is:

1. A device for supplying electrical power to a detector, a control system, and a signaling system which are connectable to an alarm line, comprising:
   a control center connectable to the alarm line and to a power supply line, the control center including:
   a controller,
   a signaling arrangement, and
   a first power supply terminal having a first overcurrent detector, a first
   overcurrent limiter, and a first disconnection element,
   wherein the detector, the control system, and the signaling system are each connectable to a respective power supply device, each power supply device including a second overcurrent detector, a second overcurrent limiter, and a second disconnection element, and each power supply device being connectable to the power supply line.

2. The device of claim 1, wherein each power supply device is configured to keep the second disconnection element open if an overcurrent on the power supply line is detected by the second overcurrent detector during a startup of a power supply.

3. The device of claim 1, wherein the power supply line is arranged as a ring.

4. The device of claim 3, wherein the control center further includes:
a second power supply terminal at a ring output, the second power supply terminal including a counter, a third overcurrent detector, a third overcurrent limiter, and a third disconnection element,
wherein the control center starts the counter when the control center connects the power supply line to a ring input using electrical power, and
wherein if the ring output does not have voltage after the counter has expired, the second power supply terminal connects the ring output to an electrical energy source.

5. The device of claim 1, wherein one of the detector, the control system, and the signaling system outputs a notification to the control center via the alarm line that the one of the detector, the control system, and the signaling system is supplied with electrical power.

6. The device of claim 1, wherein the controller is configured to induce the signaling arrangement to output a corresponding signal when an overcurrent is detected by the first overcurrent detector.

7. The device of claim 4, wherein the controller is configured to induce the signaling arrangement to output a corresponding signal if the controller determines from a status message that at least one power supply device is not supplied with power.

8. The device of claim 1, wherein the second disconnection element, the second overcurrent detector, and the second overcurrent limiter are located in a housing separate from a housing for the detector, the control system and the signaling system.

9. The device of claim 1, wherein the control center further includes an analog/digital converter connectable to the power supply line.

* * * * *

UNITED STATES PATENT AND TRADEMARK OFFICE
CERTIFICATE OF CORRECTION

PATENT NO. : 6,778,371 B2
DATED : August 17, 2004
INVENTOR(S) : Gerhard Koida

It is certified that error appears in the above-identified patent and that said Letters Patent is hereby corrected as shown below:

Column 5,
Line 19, change "present, invention" to -- present invention --
Lines 36-37, change "in order to switch 20," to -- in order to switch switch 20, --

Signed and Sealed this

Thirty-first Day of May, 2005

JON W. DUDAS
*Director of the United States Patent and Trademark Office*